Aug. 4, 1970

B. WALTERS 3,523,031

PROCESS FOR MAKING ORNAMENTAL PLASTIC SHEETING

Filed March 1, 1967

INVENTOR.
BEN WALTERS

BY

*[signature]*

ATTORNEY

United States Patent Office 3,523,031
Patented Aug. 4, 1970

3,523,031
PROCESS FOR MAKING ORNAMENTAL
PLASTIC SHEETING
Ben Walters, Miami Beach, Fla.
(4600 E. 11th Ave., Hialeah, Fla. 33013)
Filed Mar. 1, 1967, Ser. No. 619,846
Int. Cl. B44d 1/094
U.S. Cl. 117—21                          5 Claims

ABSTRACT OF THE DISCLOSURE

An ornamental plastic sheet is produced by placing a layer of plastic powder on the upper surface of a strip of material containing a design, heating the powder on the strip until the powder becomes tacky, distributing a layer of pellets of a compatible plastic material over the tacky layer of powder, and heating the pellets until they become soft, cooling the sheet, so that the pellets adhere to each other and to the strip containing the design.

---

This invention relates to plastic sheeting and more particularly it relates to a method of making an ornamental plastic sheet.

A process for making a composite ornamental plastic sheet which intensifies the color of the underlying design on a cloth sheet by placing powdered plastic material over the desired surface of the sheet, heating the powder until it is tacky, dispersing an even layer of plastic pellets, preferably colorless, over the tacky layer, heating the pellets until they adhere to themselves and the layer, and cooling the pellets forming an integral sheet.

In the prior art, ornamental plastic sheeting has been made in various ways. One method of making a plastic sheet is to use vari-colored plastic material fused together to form a sheet. Another method fused together vari-colored particles or granules of plastic material levelled to form a vari-colored plastic sheet. While ornamental plastic sheets were produced by these processes, it was ordinarily impossible to duplicate the coloring effect and oftentimes only close approximations of desirable color effects were obtained. Making ornamental plastic sheets by the prior art methods was considered in art with respect to obtaining the desired coloring or ornamental effect. While the plastic sheeting made from the prior art method was satisfactory from a technical standpoint, oftentimes it was not especially attractive in appearance and depended upon the workers' skill in distributing the colored plastic granules. It was difficult, if not impossible, to create multicolored designs in the plastic sheets, such as flowers, figures, scenes, or artwork.

The present invention discloses a process by which an ornamental plastic sheeting is obtained containing a design which can be repeated as many times as desired, and which produces a highly attractive colorful appearance to the viewer, especially when the ornamental plastic sheeting is interposed between the viewer and a source of light.

Accordingly, it is an object of the present invention to produce an ornamental plastic sheet containing a design, which can be repeated any number of times as desired.

Another object of the present invention is to provide a process for producing an ornamental plastic sheet in which the coloring effect has greater intensity than the original coloring material.

A further object of the present invention is to produce composite flexible sheets of diverse colors and designs using clear plastic material.

A still further object of the present invention is to provide a process for producing a relatively inexpensive, highly ornamental plastic sheet having a predetermined, repeatable design.

Still another object of the present invention is to provide a process to produce a highly ornamental composite plastic sheet that accomplishes all of the above and which utilizes inexpensive and unskilled labor and low cost materials and apparatus.

Other objects and features of the present invention will be apparent when the following description is considered in connection with the annexed drawings, in which.

Similar reference characters refer to similar elements throughout the several views of the drawings.

Figure 1:
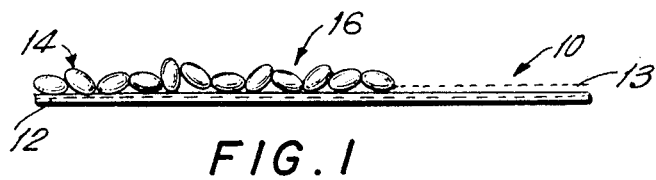
FIG. 1 is a cross-sectional elevational view of a composite plastic sheeting made in accordance with the present invention.
Figure 2:
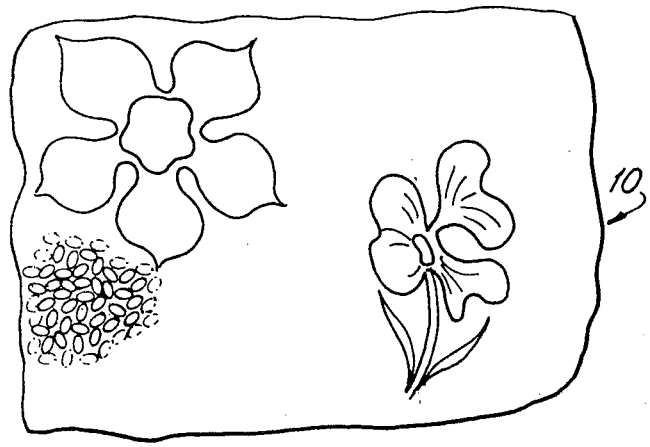
FIG. 2 is a top plan view of a portion of the sheet of FIG. 1, illustrating some designs.

In FIGS. 1 and 2 is shown an ornamental composite plastic sheet 10 made in accordance with the present invention. As shown, the plastic sheet includes a strip of cloth or paper material 12, containing the desired design in any desired colors, such as illustrated in FIG. 2. Strip 12 can be relatively inexpensive having the desired design printed on the upper surface. A powdered plastic material is disposed on the upper surface of strip 12 in an even thin layer 13 covering the surface. The powder is heated so that it becomes tacky. Spread evenly over the tacky layer 13 are pellets 14 of suitable plastic material. These pellets could come in a variety of shapes and forms, such as oval, disc, star, triangle, etc. The pellets 14 when heated become softened and are fused or welded to each other and to the tacky powder layer 13. Upon cooling, the tacky powder layer 13 is permanently and firmly adhered to the strip 12, as well as to the pellets 14, making a unitary sheet. The heating and fusion of the pellets form a variety of shapes and forms, such as seen best in FIG. 1.

Figure 4:
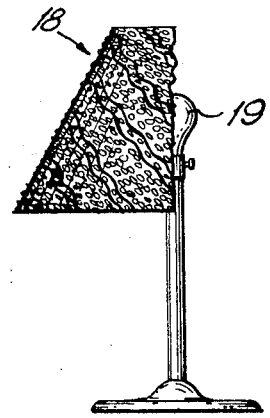
FIG. 4 is a front-elevational view of a portion of a lampshade made from the ornamental sheet of the present invention, partially broken away.

Viewing the designs on strip 12 through the pellets 14, such as in the direction of arrow 16 shown in FIG. 1, increases and emphasizes the coloring effect of the designs of strip 12. The design and ornamentation of the cloth layer 12 is diffused and amplified by the pellets, so that the colors have greater intensity than the colors of the original cloth strip 12. This intensity of coloring is further amplified if the ornamental plastic sheet is viewed when a source of light is behind it, such as illustrated in FIG. 4. In FIG. 4 is shown a lampshade 18 formed from a plastic ornamental sheet made in accordance with the present invention. The coloring effect of cloth strip 12 is heightened when bulb 19 is illuminated to create a vivid color.

Figure 3:
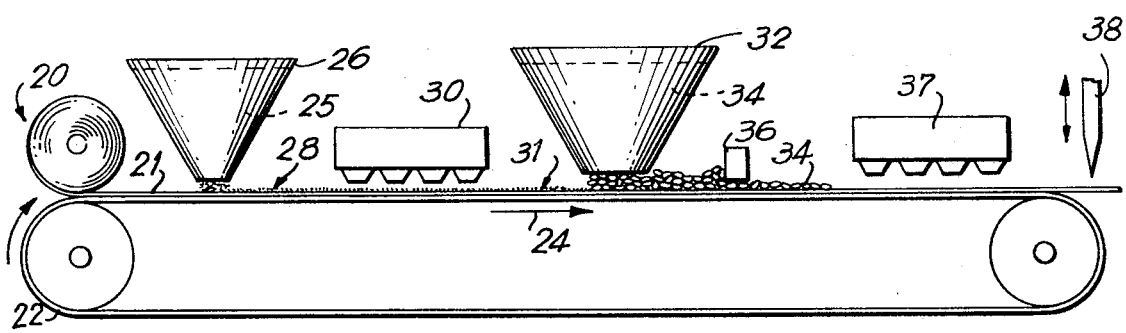
FIG. 3 is a schematic elevational view disclosing one process for continuously producing an ornamental plastic sheet.

A process of making plastic sheet 10 is illustrated in FIG. 3. A roll of cloth material 20 is shown at the left side of a conveyor belt 22. Roll 20 is rotatably supported above conveyor belt 22, which moves in the direction shown by arrow 24. The strip of cloth 21 from roll 20 is placed on the upper surface of the moving conveyor 22 and caused to move with it in any convenient manner, such as by clamps, friction or the like. A supply of powdered plastic material 25 is shown in hopper 26 and is deposited over the entire upper surface of strip 20 in a thin even layer, indicated at 28, in any convenient manner, such as by vibratory controls, screens, or the like. As strip 21 with powdered plastic layer 28 continues on conveyor 22, the powdered layer 28 is heated, illustrated by a bank of infrared lamps 30. The powdered layer is heated to about 300° F. to about 500° F., until the powdered material becomes tacky. The cloth strip 20 with the tacky plastic layer illustrated at 31 moves on with conveyor 22, until it passes beneath hopper 32 containing pellets 34 of suitable plastic material. Pellets 34 are spread onto the tacky plastic layer 31 in an even layer. To aid the leveling step, a straight edge 36, raised a predetermined height above conveyor 22 maintains a level surface. Pellets 34 are softened by another bank of infrared lamps 37, and are fused to each other and to plastic layer 31, so as to form an integral unitary composite layer of material including cloth and granules. If desired, the plastic sheeting can be cut to desired length, such as by a cutting arm 38, after cooling the sheet to solidify the plastic.

While the application of heat to the powder layer and to the pellets is shown by infrared lamps, other heat sources could be used, such as ovens and heat applied by conduction, convection or radiation. Further, while a method of continuously producing an ornamental sheet has been shown, the sheets can be made by a batch method by precutting strip 12 to predetermined shapes and length, such as placemats, distributing the plastic powder over the entire surface, heating the powder until tacky, applying an even layer of granules of plastic material to the tacky surface, and further heating the granules until the sheet becomes a unitary composite plastic material.

While clear plastic has been used and produces highly effective results, a mixture of vari-colored plastic granules will yield a variegated sheet of material and further adds additional coloring to the designs of the cloth itself.

While plastic material, such as ethylene-vinyl acetate copolymer has been used effectively, other plastic materials having similar properties can be used, such as ethylene acrylate, polyethylene, polyvinyl chloride, polyvinyl acetate, ionomer and polystyrene.

The present invention eliminates any waste of plastic material, since the powder and pellets are distributed only over the entire surface of the precut cloth or paper strip. Thus the process allows sheets of unusual and odd shapes to be produced by only cutting the cloth strip, which is easy and has highly developed apparatus. Further, printing of designs and art on cloth and paper is inexpensive and easy to produce. Thus with the present disclosure, inexpensive but durable and highly ornamental plastic sheets are produced, which have greater color intensity than the original colors on the cloth or paper strip.

While preferred embodiments have been described above, it would be understood that many variations thereof will be readily apparent to those skilled in the art without departing from the spirit thereof, therefore, it is intended that the foregoing description shall be deemed illustrative only and not construed in a limiting sense, the present invention being defined solely by the appended claims.

What I claim is:

1. A process for producing an ornamental sheet which comprises depositing a substantially colorless powdered plastic composition in a thin layer on the design surface of the sheet containing a design, heating the powdered layer to cause it to become tacky, depositing a layer of substantially transparent pellets of plastic composition over the tacky layer, heating the pellets to cause them to become soft without complete coalescence thereof to form a layer on said tacky layer, and cooling said pellets and sheet to form a coherent, substantially clear plastic mass covering the design on said sheet.

2. The method of making an ornamental plastic sheet in accordance with claim 1, wherein the plastic material is clear ethylene-vinyl acetate copolymer.

3. The method of making an ornamental plastic sheet in accordance with claim 1, wherein the powder is heated to between 300° F. to 500° F. until tacky.

4. The method of making an ornamental plastic sheet in accordance with claim 1, wherein the plastic powder and the plastic pellets are colorless and the underlaying strip is cloth.

5. A method of making an ornamental sheet in accordance with claim 1 wherein a portion of the plastic pellets are vari-colored.

References Cited

UNITED STATES PATENTS

| | | | |
|---|---|---|---|
| 884,998 | 4/1908 | Booth | 117—25 |
| 1,765,981 | 6/1930 | Kathe | 117—25 |
| 2,761,177 | 9/1956 | Walters | 117—21 |

FOREIGN PATENTS

| | | |
|---|---|---|
| 17,310 | 10/1898 | Great Britain. |
| 757,076 | 9/1956 | Great Britain. |

WILLIAM D. MARTIN, Primary Examiner

R. M. SPEER, Assistant Examiner

U.S. Cl. X.R.

117—29